Patented June 5, 1934

1,961,316

UNITED STATES PATENT OFFICE 1,961,316

MANUFACTURING FLAT - WALLED OR SHEET-LIKE CELLULOSE PRODUCTS

Richard Weingand, Bomlitz, near Walsrode, Germany

No Drawing. Application August 31, 1931, Serial No. 560,487. In Germany September 5, 1930

4 Claims. (Cl. 18—57)

This invention has reference to the manufacture of foils, films, ribbons, bands and similar sheet-like or web-like articles of manufacture from aqueous solutions of cellulose, and, among other objects, it is intended by this invention to greatly facilitate the manner of manufacture of such product, and to increase the strength and other valuable qualities thereof. The manufacture of bands, ribbons, boxes, casings, tubes and of other substantially web-like flat-walled or sheet-like articles from aqueous solutions of cellulose has been effected heretofore by introducing the solution from a slot into an acid solution of salt in which a coagulation and solidification of the article is effected, whereupon the product obtained is caused to pass through the desulphurizing, washing and bleaching liquids, and is then finally dried. In some cases the coagulation has been effected by a neutral or faintly acid salt liquor, while the fixation, or solidification and the regeneration are effected in another acid bath. The sheet-like or flat walled articles thus obtained have the objectionable property of absorbing moisture from the air and liberating the same in dry air. These changes in the contents of moisture result in a most objectionable warping and twisting of the material, which property is very annoying in the utilization of the sheets, foils or the like as for instance for packing and wrapping purposes and for other uses. Then there is the difficulty that the articles of cellulose-hydrate which have been solidified and regenerated in the usual manner possess very considerable swelling properties, so that they are of only limited strength and this fact interferes for instance with the manufacture of very thin sheets, foils and pellicles. Various attempts have therefore been made heretofore for the purpose of increasing the strength of the swelling products without any satisfactory results however.

Now my invention devises very simple means of increasing the strength and resistibility of this kind of products in the swollen as well as in the dried condition, while reducing at the same time the swelling capacity of the products. With this and other important objects in view my invention provides for the treatment of the layer of viscose which is in the course of formation and after the coagulation thereof with water removing agents, and then only the layer is passed through an acid salt liquor and through the other treating baths. It has been ascertained rather unexpectedly that these agents will produce the highly favorable change of the qualities of the products of cellulose-hydrate only in case they are applied immediately after the coagulation has been effected, while they proved to be practically inefficient if they are for instance caused to act upon the regenerated films in the manufacture of viscose films.

The procedure of dehydration or of the elimination of water from the products may be effected in different ways. Thus, the coagulated products may for instance be treated with a current of dry, hot gases, such as with hot air of about 100 degrees C., after their having left the coagulating liquor, and before passing them through the other treating baths. In accordance with a modification the coagulated products may be caused to pass through anhydrous, water removing liquids, as for instance through a bath of paraffine-oil heated to about 120 degrees C. or through any other hot oil liquor. The heating and drying may also be carried out by means of a heated support, such as for instance by means of a circulating, interiorly heated drum along which the coagulated articles are caused to pass. The regulation of the temperature of the water removing agents is controlled by the speed of operation of the entire manufacturing process. It has been found to be of advantage to effect the coagulation by means of an inorganic liquid, such as for instance methanol or some other low boiling alcohol which may be vaporized and recovered in the subsequent heating of the material.

The products obtained according to my invention are distinguished by the great decrease of swelling capacity in water, and they are therefore particularly proof against the action of moisture. The rate of swelling capacity in water amounts to only 30 percent approximately as compared with that of the products of cellulose-hydrate obtained in the usual manner. By the employment of methanol or of other organic liquids for the purpose of coagulation before the elimination of the water films and other flat-walled or sheet-like articles with particularly smooth and shining surfaces may be obtained. The new method according to this invention may be used with advantage in the case of unfermented as well as of fermented soda-cellulose and of the viscose obtained therefrom. When using aqueous solutions as coagulating liquors the same may be heated in order to accelerate the subsequent elimination of water or moisture.

*Examples*

1. A standard kind of viscose obtained from prematured alkali-cellulose and with a chloride-of ammonia-maturity of 12 is applied by means of a slot-pourer to a drum rotating with a speed of 20 to 30 m. in the minute. The drum dips into a neutral bath composed of a 20 percent solution of ammonium-sulphate and the solidified film is removed from the drum and conducted out of the bath. The film thus obtained which is merely coagulated, that is to say, which still consists of xanthogenate is conducted through a water-bath where it is superficially rinsed and then it is applied to a carrying band which passes together with the film through a drying space having a temperature of 100 degrees C. The dried film which may be rinsed again with water is conducted then through a bath of acid-sulphate in which the regeneration takes place. Finally the succeeding washing, bleaching, desulfurizing and drying steps are effected as usually.

2. A kind of viscose, obtained from a soda-cellulose without preliminary maturity, and containing 5% of cellulose and 5% of alkali is issued from a slot-pourer onto a drum rotating in a hot bath of 50 degrees C., and containing 20% of sulphate of ammonia and 10% sodium-sulphate. The film removed from the drum is passed through a drying channel or the like heated to 120 degrees C. It is then conducted through a second bath in which it is freed from the acid for the purpose of regeneration, and finally it is submitted to the usual further treatment.

3. A normal kind of viscose with preliminary maturity and possessing an ammonium-chloride-number of 10 is formed to a film by means of 25 percent solution of acetic acid which contains moreover 10% of sodium-acetate, during which procedure only a coagulation of the film takes place. The further treatment of the coagulated film is effected as stated with reference to Example 1 or 2.

4. A standard viscose, obtained from prematured soda-cellulose and having an ammonium-chloride-number of 3 is coagulated to a film in a methanol-bath at 18 degrees C. The thus solidified film is thereupon immediately passed through a drying space having a temperature of about 90 degres C. and in which the methanol and the water adhering to the film become evaporated. The film is treated in the usual way.

5. A standard viscose, obtained from prematured soda-cellulose and with an ammonium-chloride-number of 3 is coagulated to a film in a methanol-bath at 10 degrees C. The coagulated film is immediately thereupon passed through a bath of paraffine-oil heated to 120 degrees C. and is then further treated as set forth in Example 1.

It should, of course, be understood that the invention may be carried out with different proportions and temperatures of agents and that it is not limited to the manner of treatment hereinbefore described merely by way of exemplification, and that it is susceptible of modifications, except as otherwise appears from the appended claims.

I claim:—

1. A process for the production of foils and sheets from aqueous solutions of cellulose more particularly of viscose which comprises coagulating the foils in a precipitating bath, then treating the foils with water-expelling agents for completely removing the water in the foils, and thereafter introducing the foils thus treated into a regenerating bath.

2. A process as set forth in claim 1, in which said water-expelling agent consists of hot dry gases.

3. A process as set forth in claim 1, in which said water-expelling agent consists of a high-boiling and water-immiscible liquid.

4. A process as set forth in claim 1, in which the coagulation is produced with an alcohol of low boiling point.

RICHARD WEINGAND.